United States Patent [19]

Bray

[11] 4,090,738
[45] May 23, 1978

[54] BRAKING SYSTEM FOR TRACTOR-TRAILER COMBINATIONS

[75] Inventor: Robert J. Bray, Huntington Woods, Mich.

[73] Assignee: Brake Systems, Inc., Detroit, Mich.

[21] Appl. No.: 650,861

[22] Filed: Jan. 21, 1976

[51] Int. Cl.$^2$ ............................................. B60T 13/00
[52] U.S. Cl. ......................................... 303/7; 303/13; 303/29; 303/69
[58] Field of Search .................... 303/7, 9, 13, 28, 29, 303/30, 40, 6, 37, 68–69, 52; 188/3, 112; 137/627.5

[56] References Cited

U.S. PATENT DOCUMENTS

| | | | |
|---|---|---|---|
| 3,001,831 | 9/1961 | Stelzer | 303/7 |
| 3,240,538 | 3/1966 | Valentine | 303/29 |
| 3,285,672 | 11/1966 | Avrea | 303/9 |
| 3,507,542 | 4/1970 | Cannella | 303/7 |
| 3,765,729 | 10/1973 | Toomey | 303/13 X |
| 3,857,614 | 12/1974 | Kurichh | 303/40 X |

Primary Examiner—Trygve M. Blix
Assistant Examiner—Douglas C. Butler
Attorney, Agent, or Firm—Cullen, Settle, Sloman & Cantor

[57] ABSTRACT

A bracking system for tractor-trailer combinations wherein the air delivery time to the trailer brakes is substantially reduced. A boost-air assembly having its own air supply is mounted at the forward end of the air delivery system. The assembly includes a fast-acting amplifying relay valve, a closely-coupled air tank and a bracket for mounting the valve and the tank. In the prime embodiment, the assembly is mounted on the tractor proximate the rear thereof to significantly reduce the time required to transmit a control pressure to the trailer brake actuators because (1) less time is required for the control pressure to reach the amplifying valve, (2) the fast response time of the valve, (3) the amplification achieved by the valve and (4) the proximity of the closely-coupled auxiliary air tank. Alternate mounting loctions are also taught for mounting one or more boost-air assemblies for even further lessening air delivery time to the trailer brakes.

6 Claims, 8 Drawing Figures

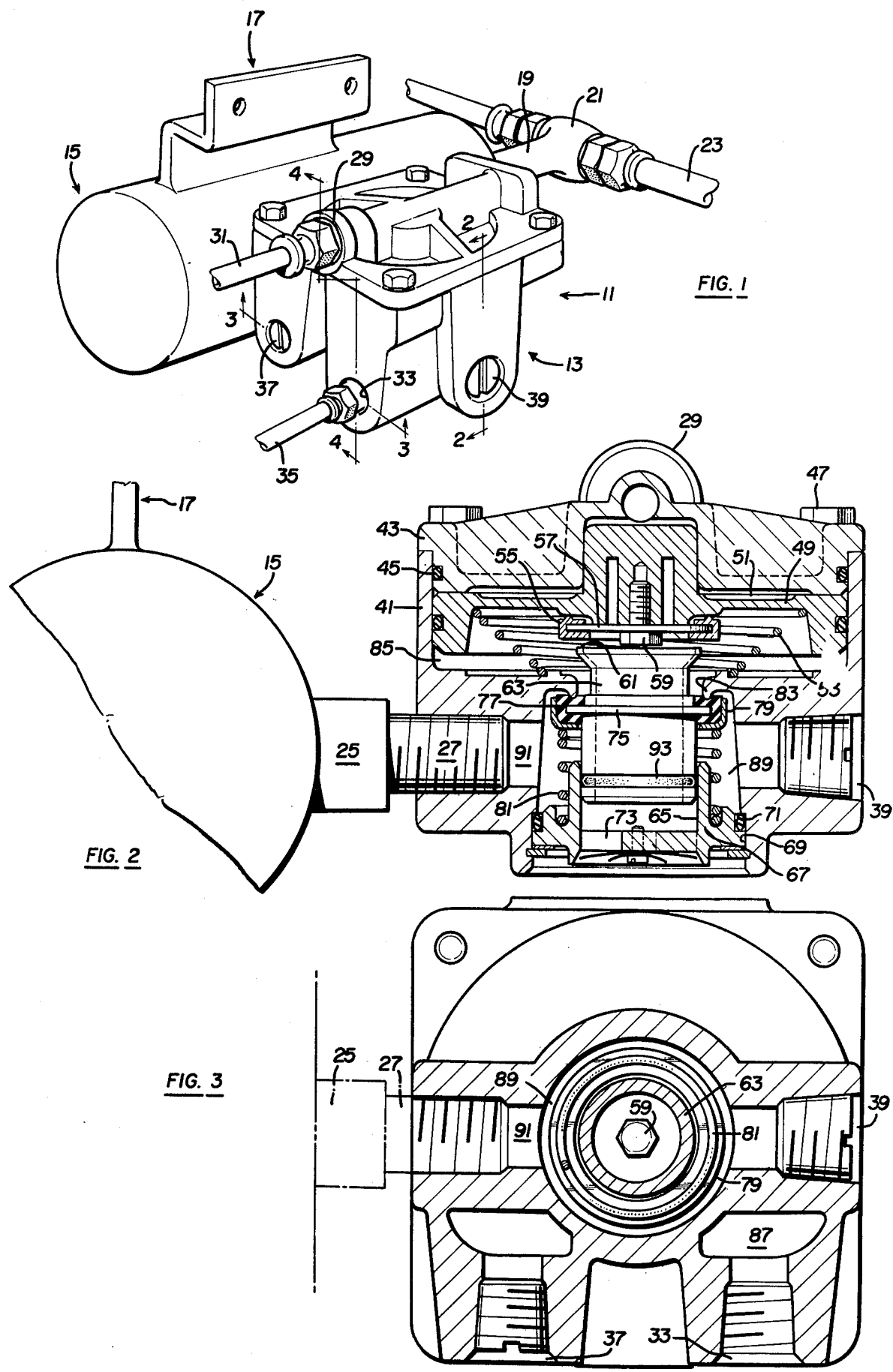

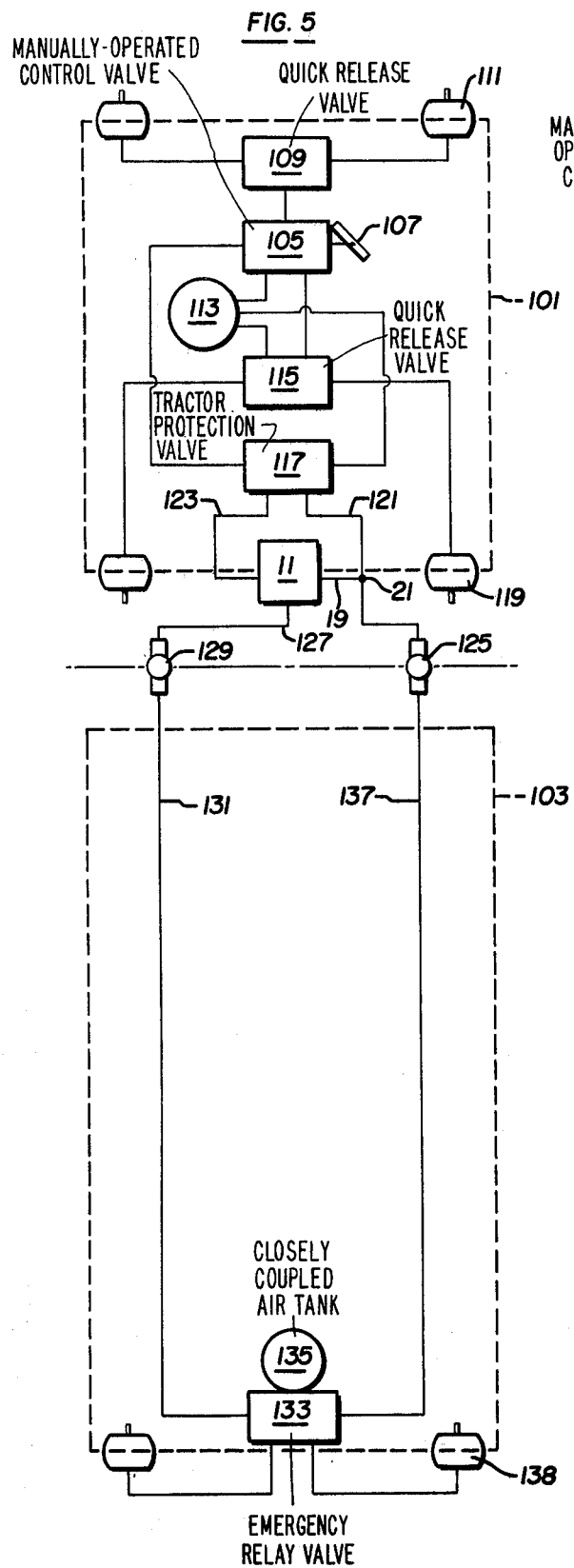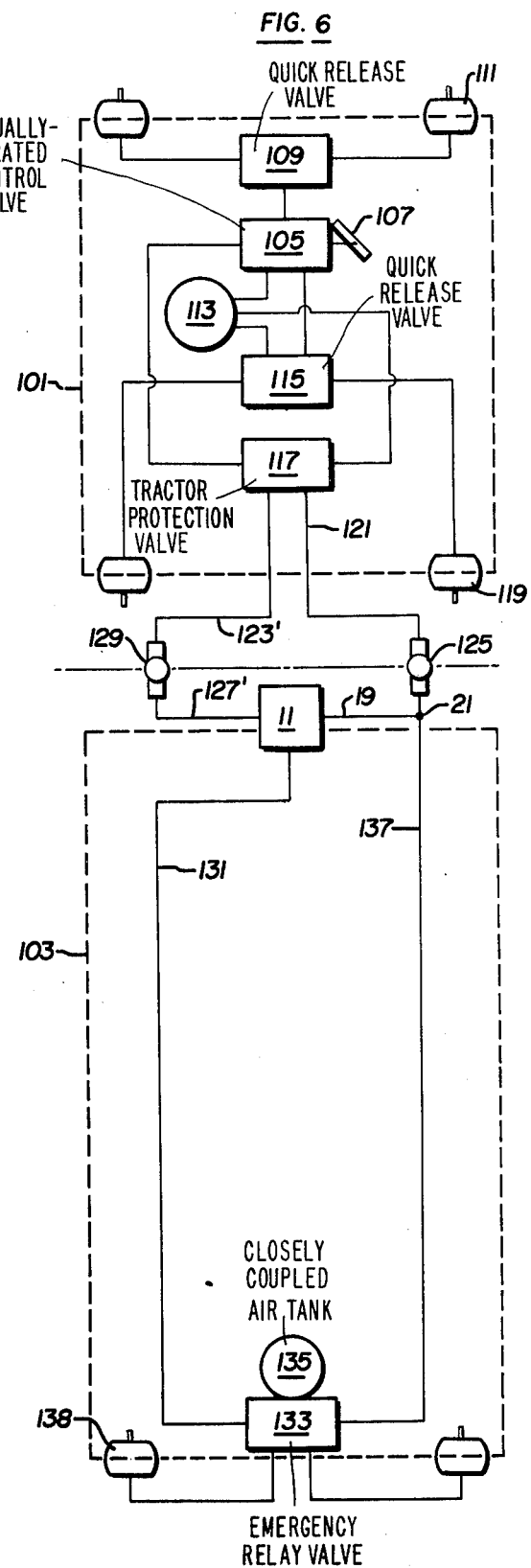

BRAKING SYSTEM FOR TRACTOR-TRAILER COMBINATIONS

BACKGROUND OF THE INVENTION

1. Field of the Invention

The invention relates generally to an improved braking system for tractor-trailer combinations, and more specifically to an improved braking system employing a fast-acting booster valve assembly for substantially reducing the fluid pressure delivery time to the brakes of a semi-trailer or trailer.

2. Description of the Prior Art

In a conventional tractor-trailer brake system, it is common practice to control the operation of the trailer brake actuators in accordance with pressure impulses passing through a service line incident to the operation of a manually-operated brake pedal located on the tractor. Due to the fact that there is a finite time lag between the time at which the pressure impulses reach the tractor brake actuators and the time at which the pressure impulses reach the trailer brake actuators, the tractor brakes often engage ahead of the trailer brakes and may result in trailer overrun or "jackknifing".

It has become common practice to provide the tractor with a hand valve for controlling the actuation of the trailer brakes so that the operator can snub the trailer brakes, when desired, or initiate the operation of the trailer brakes prior to the time at which he engages the foot pedal to insure that the trailer brakes are engaged ahead of the tractor brakes. The disadvantage of such hand valves lies in the fact that the overrun problem is most evident in emergency type situations in which the operator would have insufficient time to think of applying the hand valve ahead of the foot pedal.

The prior art recognizes this problem and attempts have been made to compensate for the lag time resulting from the length of the service line between the manually operated control valve in the tractor and the trailer brake actuators. Many of the purposed solutions employ an electrical means responsive to the initial engagement of the foot pedal to transmit an electrical signal prior to the time that the pedal has been engaged sufficiently to actuate the tractor brakes. The electrical signal can be used to operate a solenoid or the like which controls the emergency relay valve to supply fluid pressure to the trailer brake actuators without waiting for the pressure impulses in the service line to reach the emergency relay valve. Such systems suffer from several disadvantages. The tractor itself must be modified to generate the electrical control signals, and electrically responsive valves must be provided on the trailer to control the emergency relay valve. Additionally, both tractors and trailers must be equipped with electrical wires for transmitting the signals from the tractor to the electrically operated valve. The results in a greatly increased initial expense, in increased maintenance costs, and in an additional source of failures within the brake systems. As a result, such electrically-controlled valves have met with little success in the trucking industry.

U.S. Pat. No. 3,001,831, which issued to William Stelzer on Sept. 26, 1961 for a "Tractor-Trailer Brake System", teaches a non-electrical auxiliary valve interposed in the service line and mounted on the trailer just ahead of the emergency relay valve. This auxiliary valve lessens the delivery time of air to the trailer brakes soley because of amplification within the valve. The auxiliary valve is, in commercial practice, mounted on the rear of the trailer just forward of the emergency relay valve. There is still a finite time lag as the pressure impulses travel from the tractor control valve along the service line to the auxiliary valve. Additionally, the valve is relatively slow acting and does not have its own closely-coupled air reservoir. Therefore, while the auxiliary valve does operate to lessen the air delivery time to the trailer brakes, it does not substantially lessen the air delivery time so as to insure that the trailer brakes engage not later than the time which the tractor brakes engage. Trailer overrun and "jackknifing" can still occur; hence a further lessening of the air delivery time is required. Furthermore, complex adjustments must be made to the Stelzer auxiliary valve to prevent trailer "hopping" in deadheading applications since hopping leads to tire wear and possible unsafe conditions. Furthermore, the prior art does not teach braking systems which are especially suited to todays complex semi-trailer and tractor combinations and trains. The present invention provides a fast-acting independent booster-valve and directly coupled air source combination which is located at the start of the air delivery system to insure a faster application of the trailer brakes. The system of the present invention does not require adjustments for dead-heading operations; insures greater compatibility between diverse tractor and trailers; and is less expensive due to the truck-mounting capability which enables a small fleet of tractors to be modified so as to handle a much larger fleet of trailers which may remain unchanged.

SUMMARY OF THE INVENTION

In the prime embodiment of the present invention a boost-air assembly is mounted to the tractor proximate the rear thereof. The boost-air assembly includes a fast-acting auxiliary amplifying relay valve having an auxiliary fluid pressure reservoir directly connected to and mounted proximate of said auxiliary amplifying valve and a bracket for mounting the auxiliary amplifying valve and its closely-coupled fluid pressure reservoir to the rear of the tractor. This arrangement reduces the air delivery time to the trailer brakes by (1) reducing the time it takes for the control pressure generated by the manually operated control valve in the tractor to travel through the service line to the auxiliary amplifying valve, (2) the fast response time of the auxiliary amplifying valve itself, (3) the amplification of the control pressure performed by the auxiliary amplifying valve, and (4) the proximity of the auxiliary fluid pressure reservoir to the auxiliary amplifying valve. These four factors combine to substantially lessen the air delivery time to the trailer brakes thereby insuring that the trailer brakes are actuated no later than the time at which the tractor brakes are actuated to prevent trailer overrun and "jackknifing".

The concept of mounting the boost-air assembly at the start of the air delivery system serves a dual function. In addition to reducing the time it takes for the control pressure to travel from the manually operated control valve in the tractor to the auxiliary amplifying valve, it also allows an entire fleet to be equipped with the present invention without modification to any of the trailers. The boost-air assemblies may be mounted to the small number of tractors normally found in a fleet and these tractors can operate with all of the relatively large number of trailers in the fleet without requiring modifications of the trailers. Still further, the use of the boost-air assembly of the present invention increases compatibility between existing trailers and the newer, faster-reacting braking systems now required on tractors in many states.

Alternate embodiments are provided wherein the boost-air assembly of the present invention is mounted on the semi-trailer of a tractor/semi-trailer combination proximate to the front of the semi-trailer. This is close to the start of the air delivery system and is often necessitated in applications where tractor mounts are not feasible. In combinations involving a tractor, a semi-trailer, and a true trailer, one of the boost-air assemblies would preferably be mounted on the tractor proximate to the rear thereof while a second boost-air assembly would preferably be mounted on the semi-trailer proximate the rear thereof. Still alternately, in such tractor/semi-trailer/true trailer combinations, the first boost-air assembly may be mounted on the semi-trailer at the forward end thereof while a second boost-air assembly is mounted on the true trailer proximate the forward end thereof. Each of these combinations result in a substantial decrease in the air delivery time to the semi-trailer/true trailer brakes so as to prevent trailer overrun and "jackknifing".

The systems of the present invention do not require any additional lines or electrical connections coupled between the truck and the semi-trailer/true trailer since only the conventional service and emergency lines are employed. Additionally, the systems of the present invention do not need periodic adjustments to compensate for changes in the load and are ideal for preventing trailer "hopping" in dead-heading applications thereby reducing tire wear and increasing operational safety. The present systems insure that the trailer brakes will engage before or at least no later then the tractor brakes so as to provide vehicle stability and allow the operator to "feel" the trailer brakes. This provides an anchoring effect to help the driver negotiate turns and enables the operator to sense wheel lock up before trailer "hopping" or "jackknifing" have occurred. The present system results in shorter braking distances and decreased tire wear. It eliminates the need for hand valve use and has proven ideal for use on doubles, short doubles, and trailer trains.

BRIEF DESCRIPTION OF THE DRAWINGS

Other objects features and advantages of the present invention will be readily apparent and better understood by reference to the following detailed description when considered in conjunction with the appended claims and the accompanying drawings, a description of which follows:

FIG. 1 shows a prespective view of the boost-air assembly of the present invention;

FIG. 2 shows a side view, partially in elevation, taken along the view lines 2—2 of FIG. 1;

FIG. 3 is a bottom view, partially in section, taken along the view lines 3—3 of FIG. 1;

FIG. 5, is a schematic diagram illustrating the preferred tractor-mounted system of the present invention;

FIG. 6 is a schematic diagram of the preferred trailer-mounted system of the present invention;

DESCRIPTION OF THE PREFERRED EMBODIMENT

Figure 4:
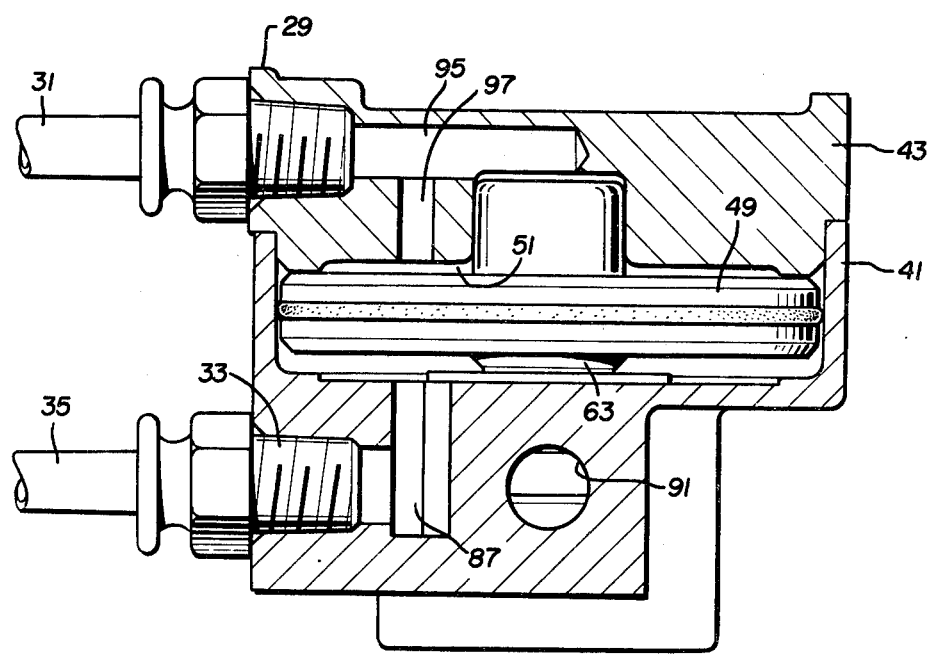
FIG. 4 is a side view, partially in elevation, taken along the view lines 4—4 of FIG. 1.

FIG. 1 illustrates the boost-air kit or assembly 11 of the present invention. The boost-air assembly 11 includes a fast-acting auxiliary amplifying relay valve 13, a closely-coupled auxiliary fluid pressure reservoir 15 and a mounting bracket assembly 17. The bracket assembly 17 is fixedly secured to the top of the auxiliary fluid pressure reservoir 15 as by welding or the like. The shape of the bracket assembly 17 will be dictated by the location at which it is to be secured, as known in the art. The auxiliary fluid pressure reservoir 15 has an input conduit 19 terminating at a T-connection 21. The crossbar of the T-connection 21 connects to the emergency supply line 23 of the tractor-trailer braking system to maintain the fluid pressure within the auxiliary reservoir 15 at the pre-determined fluid pressure dictated by the main tractor-mounted fluid pressure reservoir. The supply outlet 25 of the auxiliary fluid pressure reservoir 15 is directly connected to the supply input 27 of the auxiliary amplifying relay valve 13. The direct connection of the supply output 25 and the supply input 27 effectively mounts the auxiliary amplifying relay valve 13 in close proximity to the auxiliary fluid pressure reservoir 15 so as to form a single unified assembly which can be securely mounted solely by the bracket assembly 17.

The auxiliary amplifying relay or booster valve 13 includes a valve control input 29 which is connected to the service line 31 to supply fluid control pressures from the manually operated tractor-mounted control valve to the auxiliary booster valve 13. The amplified output of the relay valve 13 is taken from output 33 and supplied to the service line control input of the trailer-mounted emergency relay valve as known in the art, via control service line 35. A second output from relay valve 13 is provided with a plug 37 to provide a gas type seal and a second supply input is provided with a similar gas-type sealing plug 39.

As illustrated in FIGS. 3, 4, and 5, the auxiliary relay valve 13 includes a generally hollow housing 41 which is sealed relative to an upper housing 43 by means of a seal 45 and is fastened thereto by any conventional manner as by bolts 47 or the like.

A piston 49 is slideably disposed within hollow housing 41 and forms a control chamber 51 at the upper side of the piston 49. The delivery of control air pressure to the control chamber 51 causes the piston 49 to move downwardly against the biassing action of a spring 53. The central portion of the piston 49 has a rubber-like valve element 55 which has a reinforcing plate 57 held at the axis of the piston 49 by means of a screw fastener 59. The valve element 55 is adapted to engage an annular lip 61 formed by the open, upper end of tubular member 63. The tubular member 63 is disposed to slide vertically in a bore 65 formed in an end cap 67 which is sealed in an opening 69 in the lower end of the housing 41 by a seal 71. An exhaust opening 73 is formed in the end cap 67 and communicates the interior of tube 63 with the atmosphere. An intermediate exterior portion of the tubular member 63 is formed with a flange 75 which receives an annular rubber element 77 having U-shaped cross-section. The valve element 77 is held on the flange 75 by a retaining ring 79 which forms a seat for one end of a spring 81 having its other end acting on the end cap 67 to urge the valve element 77 into engagement with the annular lip 83 formed internally of the housing 41.

In the position shown, the interior of the tubular member 63 communicates by way of the exhaust opening 73 with the atmosphere and by way of the opened upper end of the tube 63 with a large cavity 85 formed in the housing 41 below the piston member 49. The cavity 85 is also in communication by way of an axially offset passage 87 with the delivery for outlet port 33 which is adapted for connection with the line 35 to supply the supply line control pressure to the emergency relay valve which operates the trailer brake actuators. In this position, with the valve element 77 seated on the annular lip 83, an annular chamber 89 is formed around the exterior of the tubular member 63 which, as best seen in FIG. 2, is in communication with passage 91 which connects to the supply inlet port 27. The cavity 89 is, therefore, open to the supply port 27 which is directly connected to the auxiliary fluid pressure reservoir 15 via the reservoir output port 25. A seal 93 on the exterior of the tubular member 63 prevents fluid communication between the annular chamber 89 and the atmosphere.

Upon the delivery of control air pressure to the control chamber 51 above the control piston 49, the valve element 55 moves downwardly to engage the annular lip 61 to close the open upper end of the tube 63 and move the latter downwardly to move valve element 77 out of engagement with the annular lip 83 forming a valve seat. This places the large cavity 85 below the control piston 49 in direct communication with the supply port 27 from the auxiliary fluid pressure reservoir 15 while maintaining the large cavity 85 as well as the delivery port 33 isolated from the exhaust port 73 by way of the valve element 55 closed upon the annular lip 61.

When the relay valve 13 is in the position shown in FIG. 2, the relay valve 13 serves to communicate the delivery port 33 with the exhaust port 73, in which case the air in the brake chambers of the trailer is exhausted. Upon downward movement of the control piston 49 in response to control air pressure in the control chamber 51 above the piston 49, the delivery port 33 is isolated from the exhaust port 73 by the valve 55 moving upon the annular lip 61 of the tubular member 63, and subsequently the air pressure existing in the auxiliary fluid pressure reservoir 15 is made available through the auxiliary fluid pressure reservoir output 25, the supply input 27, the communication channel 91, annular passage 89, and through the open valve 77, 83 to the large cavity 85 and from there to the axially offset passage 87 and than to the delivery port 33 from where it may be transmitted via service control line 35 to the emergency relay valve of the trailer.

The delivery of control pressure to the control chamber 51 is via control input 29. As seen in FIG. 4, the service line 31 is connected to the control input 29. The control input 29 opens onto a communicating passage 95 which has an axially offset communicating passage 97 which opens onto the control chamber 51 when control pressure is applied to the control input 29, the fluid pressure quickly builds in the control chamber 51 and moves the piston 49 in a short stroke downward against the bias of spring 53. When control pressure is removed, the bias of spring 53 quickly restores the piston 49 to its original upwardly biassed position. The auxiliary amplifying relay valve 13 of the present invention is extremely sensitive and fast-acting. It will operate to provide initial trailer braking with only three to five psi truck service pressure as opposed to the ten to twelve psi normally required. The volumetric fill operation of the relay valve and the short stroke of the piston 49 insures a very rapid response time. The relay valve 13 can, for example, delivery 1.5 psi in 8–10 milliseconds and 3 psi in approximately 12–15 milliseconds. The use of the present valve enables air pressure to be supplied to the trailer brake chambers on a one-to-one ratio with the air pressure in the truck brake chambers up to 30 psi service application. At that point, the volumetric fill characteristic of the valve 13 increases the amplification to provide a 1:1.3 ratio up to 60 psi service pressure.

The use of such a quick-acting valve is particulary useful in the system of the present invention for even more greatly reducing the air delivery time to the trailer brakes. The auxiliary amplifying relay valve 13 of the present invention could, for example, be a modification of the type of relay valve disclosed in U.S. Pat. No. 3,857,614 which is issued to S. L. Kurich on Dec. 31, 1974 for a "Air Brake Anti-Skid Control", which patent is incorporated by reference herein.

Now that the operation of the quick-acting auxiliary amplifying relay valve 13 of the present invention is understood and the booster-air assembly 11 has has been explained, its use in the improved braking systems of the present invention will be described. FIG. 5 is a schematic diagram of a tractor and semi-trailer combination in which the braking system is optimally configured. The tractor is schematically represented by the dotted block 101 and the semi-trailer by the dotted block 103. The tractor 101 has mounted thereon a manually-operated control valve 105 having a foot pedal 107 for outputing a control pressure or control pressure signal or impulse in response to the application of foot pressure to the pedal 107. The control pressure is supplied to a quick release valve 109 and used to operate a first pair of tractor brake actuators 111. The main tractor fluid pressure reservoir 113 supplies fluid pressure to the control valve 105, to a second quick release valve 115 and to the tractor protection valve 117. The second quick release valve 115 is used to control the operation of another pair of tractor brake actuators 119 and the tractor protection valve 117 has its other input coupled to receive the control pressure signal from the output of the control valve 105. The emergency output of the tractor protection valve 117 is coupled to a emergency line 121 and the service line output is connected to a service line 123. The boost-air kit or assembly 11 is represented schematically by the similarly numbered bi-sected square 11.

The boost-air assembly 11 is shown in FIG. 5 as being mounted on said tractor proximate the rear thereof and just behind the tractor protection valve. As shown in FIG. 1, the service line 123 would be connected via line 31 (FIG. 1) to the control input 29 of the auxiliary amplifying relay valve 13. The supply input of the auxiliary fluid pressure reservoir 15 would be connected via the T-connection 21 and conduit 19 to the emergency line 121. The rear portion of the T-connection 21 couples the emergency line 121 to a hose coupling 125 while the delivery output 33 of the auxiliary relay valve 13 is connected via service control line 127 to a similar hose coupling 129. The phantom line drawn through the hose couplings 125 and 129 represent the theoretical separation between the tractor 101 and the semi-trailer 103.

The opposite end of the hose coupling 129 is connected to the trailer service control line 131 which travels the entire length of the trailer to terminate at the control input of an emergency relay valve 133 having a closely coupled air tank 135. The emergency line 137 is coupled to the opposite end of hose coupling 125 and supplies emergency line pressure to the emergency line input of the emergency relay valve 133. The outputs of the emergency relay valve are connected to a pair of semi-trailer brake actuators 138 such that the emergency relay valve 133 responds to the amplified control pressure arriving over control service line 131 and triggers the delivery of air to the semi-trailer brake actuators 137.

By locating the boost-air assembly 11 at the forward end of the air delivery system, the time delay for the control signal to travel from the control valve 105 to the control input 29 (FIG. 1) is greatly reduced, thereby decreasing the overall delivery time of braking pressure to the semi-trailer brakes. Similarly, by mounting the boost-air assembly 11 on the tractor, the installation of a relatively small number of kits will effectively convert the entire fleet regardless of the number of trailers currently utilized.

An alternate embodiment of the system of the present invention is shown in FIG. 6. In this embodiment, the boost-air assembly 11 is mounted on the semi-trailer 103 proximate the forward end thereof. The service line output of the tractor protection valve 117 is supplied by conduit 123' to hose coupling 129 and the other end of hose coupling 129 is supplied via trailer service line 127' to the control input 29 (FIG. 1) of the boost-air assembly 11. The emergency line output of the tractor prosection valve 117 is coupled to one end of hose coupling 123 and the other end of hose coupling 125 is connected to the trailer emergency line 137. The T-connection 22 couples the emergency line 137 to the auxiliary fluid pressure reservoir 15 via supply input 19. The delivery output 33 of the auxiliary relay valve 13 is coupled via the semi-trailer service control line 131 to the emergency relay valve 133, as previously described, to control the delivery of air from the closely coupled tank 135 to the trailer brake actuators 138.

Figure 7:
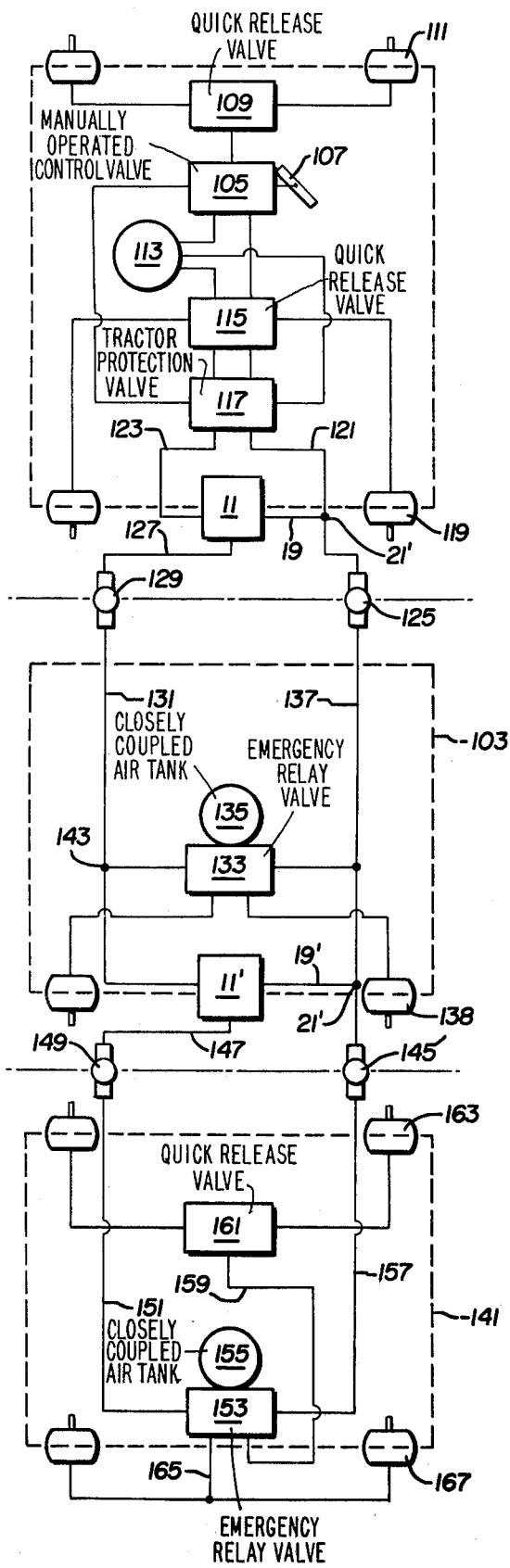
FIG. 7 is a schematic diagram of a tractor semi-trailer, true trailer combination employing the preferred tractor-mounted boost-air assembly and a second semi-trailer mounted boost-air assembly.

The preferred embodiment for a tractor, semi-trailer, true trailer combination is illustrated by the schematic diagram of FIG. 7. The tractor is schematicly represented by the dotted block 101 the semi-trailer by the dotted block 103, and the true trailer by the dotted block 141. In the preferred embodiment, a first boost-air assembly 11 is mounted on the tractor 101 proximate the rear thereof for lessening the air delivery time to the semi-trailer brakes, as described with respect to FIG. 5. However, a second additional boost-air assembly 11', identical to boost-air assembly 11 of FIG. 1, is mounted on the semi-trailer proximate the rear thereof for lessening the delivery time of air to the true trailer brakes. The tractor mounted boost-air assembly 11 remains as described in FIG. 5. Additionally, the service control line 131 is coupled to the control input of an emergency relay valve 133 by means of a T-coupling 143 or the like such that an extension of the semi-trailer service control line 131' is supplied to the control input 29' of the second boost-air assembly 11'. The input 19' to the auxiliary fluid pressure reservoir 15' is connected to the semi-trailer emergency line 137 via a T-coupling 21' and the line 137 extends through the cross bar of T-connection 21' to connect to a hose coupling 145. The output 33' of the auxiliary relay valve 13' is connected via conduit 147 to one end of the hose coupling 149. The output of the hose coupling 149 is connected via the true trailer service control line 151 to the control input of the true trailer emergency relay valve 153. The emergency relay valve 153 has a closely coupled air tank 155 and an emergency line input connected to the output of hose coupling 145 via the true-trailer emergency line 157. One output of the emergency relay valve 153 is coupled via conduit 159 to a first true trailer quick release valve 161 which controls a first pair of true trailer brake acuators 163 while a second output from the emergency relay valve 153 is coupled through a line 165 to control another set of true trailer brake actuators 167.

The positioning of boost-air assemblies in the tractor, semi-trailer and true trailer combination of FIG. 7 minimizes the air delivery time to the semi-trailer and true trailer brake systems. The greatest reduction is achieved when the first boost-air assembly 11 is tractor-mounted on the rear of tractor 101 and the second boost-air assembly 11' is semi-trailer mounted proximate the rear of the semi-trailer 103.

Figure 8:
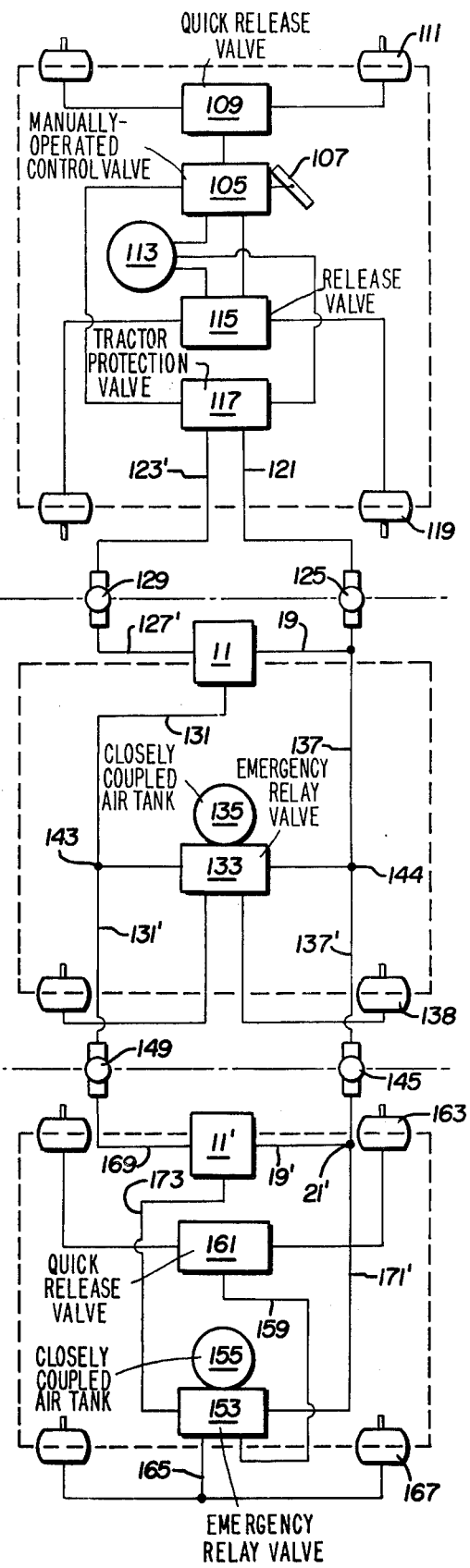
FIG. 8 is a schematic diagram of an alternate tractor, semi-trailer, true trailer combination employing an alternate system wherein the first boost-air assembly is mounted on the semi-trailer and a second boost-air assembly is mounted on the true-trailer.

An alternate embodiment of the system of the present invention for use in in a tractor, semi-trailer, and true trailer combination is illustrated in FIG. 8. In this embodiment, the first boost-air assembly 11 is mounted on the front of the semi-trailer 103 as discussed previously with respect to FIG. 6 and a second boost-air assembly 11' is mounted on the true trailer itself proximate the front end thereof. A T-connection 143 is used to couple the semi-trailer service control line 131 to the control input of the emergency valve 133. The crossbar of the T-connection 143 supplies the other end of the semi-trailer service control line 131' to a hose coupling 149. The opposite end of the hose coupling 149 is connected to the control input 29' of the second boost-air assembly 11' via a service control line connection 169. A similar T-connection 144 is connected to the emergency line 137 and supplies emergency line pressure to the emergency relay valve 133. The crossbar of the T-connection 144 of the emergency line 137 connects a second portion of the emergency line 137' to one input of a hose coupling 145. The other end of the hose coupling 145 connects to the true trailer emergency line 171. Emergency line 171 is connected via T-coupling 21' to the auxiliary fluid pressure reservoir 15' via input 19' and the crossbar of the T-coupling 21' supplies emergency line pressure to the emergency line input of a true trailer emergency relay valve 153 via the true trailer emergency line 171'. The control input to the emergency relay valve 153 is connected to the output 33' of the boost-air assembly 11' via a true trailer service control line 173.

While this combination results in a less than optimal reduction in the air delivery time to the semi-trailer and true trailer brakes, the first and second boost-air assembly 11 and 11' are located at the forward end of the air delivery system on both the semi-trailer and full trailer, hence the overall air delivery time to the trailer brakes is still substantially reduced.

In summary, it will be readily apparent to those skilled in the art that the benefits of the present invention can be achieved if the boost-air assembly of the present invention is mounted as forward in the air supply system as is possible. By mounting a boost-air assembly 11 at substantially the start of the air delivery system, the time lag between the generation of the control pressure at the manually operated control valve 105 and the receipt of the control pressure at the auxiliary relay valve 13 can be dramatically reduced. Additionally, the use of a fast-acting amplifying relay valve having its own independent auxiliary supply results in a further lessening of the air delivery time to the semi-trailer or trailer brakes. By lessening the air delivery time to the semi-trailer or true trailer brakes, the system can be utilized to insure that the semi-trailer or trailer brakes are always actuated before or at least no later than the time of actuation of the tractor brakes thereby reducing the incidents of or preventing altogether trailer overrun and "jackknifing". In dead-heading applications, the operator will be able to feel impending wheel lockup before it occurs and release the brakes to prevent trailer "hopping" which reduces tire life. The overall stopping distances of the tractor trailer combinations discuss herein can be substantially reduced and existing trailers can be made completely compatible with the enhanced tractor braking systems now required by Federal Motor Vehicle Safety Standard 121.

With this detailed description of the method and apparatus of the present invention it will be obvious to those skilled in the art that various modifications can be made without departing from the spirit and scope of the present invention which is limited only by the appended claims.

I claim:

1. In a tractor/semi-trailer combination including a tractor having a front, a rear and tractor brakes and a semi-trailer having a front, a rear and semi-trailer brakes, an improved braking system for reducing the fluid pressure delivery time to the brakes of the semi-trailer to eliminate "jackknifing" due to trailer overrun, said braking system comprising:

a pair of tractor brake actuators;
a quick release valve coupling said pair of tractor brake actuators;
a pair of semi-trailer brake actuators;
an emergency relay valve mounted proximate the rear of said semi-trailer for operating said semi-trailer brake actuators, said emergency relay valve having an output coupled to said pair of semi-trailer brake actuators, an emergency line input, a closely coupled auxiliary supply of fluid pressure coupled to a supply input, and a service line control input;
manually-operated control valve means having a foot pedal mounted in said tractor and a control valve output for delivering a control pressure signal for controlling the application of fluid pressure to said pair of tractor brake actuators;
a reservoir mounted on said tractor for storing a supply of fluid pressure, said reservoir including a line for supplying fluid pressure of said manually-operated control valve means and an emergency line output;
a tractor protection valve mounted proximate the rear of said tractor and having a service line input coupled to the control valve output of said manually-operated control valve means, an emergency line input coupled to the emergency line output of said reservoir, a service line output and an emergency line output; and
an auxiliary booster valve assembly mounted proximate the rear of said tractor and including a quick-acting amplifying relay valve and a closely coupled second auxiliary fluid pressure reservoir mounted proximate said quick-acting amplifying relay valve, said second auxiliary reservoir having an input coupled to the emergency line output of said tractor protection valve and a supply output, said amplifying relay valve including a service line input coupled to the service line output of said tractor protection valve, a supply input directly coupled to the supply output of said second auxiliary reservoir and a control output coupled to the service line control input of said emergency relay valve, said quick-acting amplifying relay valve further including volumetric displacement means responsive to the fluid pressure received at said service line input for rapidly relaying a corresponding fluid pressure to the service line control input of said emergency relay valve to minimize the time lag between the operation of the tractor brakes and the application of the semi-trailer brakes to eliminate "jackknifing".

2. In a braking system for tractor-trailer combinations including a tractor having tractor brakes, a rear end and a front end and a trailer means having trailer brakes, a rear end and a front end, the front end of said trailer means being adapted to be operably coupled to the rear end of said tractor, said combination having a manually-operable means disposed in said tractor for generating a braking control pressure, an air delivery system extending substantially the length of said tractor/trailer combination starting at the rear of said tractor adjacent said manually-operable means and extending toward the rear of said trailer means, means responsive to said braking control pressure for actuating said tractor brakes, means mounted proximate the rear of said trailer means and responsive to said braking control pressure for actuating said trailer brakes, the improvement comprising a booster assembly for reducing the air delivery time to said trailer brakes comprising:

a quick-acting relay valve having a fluid pressure supply input, a valve control input, and an amplifying signal output, said quick-acting relay valve being responsive to the receipt of said braking control pressure at said valve control input for rapidly amplifying said control pressure on at least a one-to-one ratio with the control pressure applied to the tractor brake actuator means and rapidly relaying the amplified control pressure from said amplifying signal output to said trailer brake actuator means; and means for mounting said quick-acting relay valve proximate the start of said air delivery system to enable said quick-acting relay valve to even more quickly receive and amplify said braking control pressure from said manually-operable means for even more rapidly relaying said amplified control pressure to said trailer brake actuator means;

said trailer means including both a semi-trailer and a true trailer, said semi-trailer having semi-trailer brakes, a front end adapted to be operably coupled to the rear end of said tractor and a rear end, and said true trailer having true trailer brakes, a front end adapted to be operably coupled to the rear end of said semi-trailer and a rear end, said semi-trailer including means for actuating said semi-trailer brakes and said true trailer including means for actuating said true trailer brakes, said quick-acting relay valve being mounted on said tractor proximate the rear end thereof for initially amplifying said braking control pressure and said booster assembly further including a second quick-acting relay valve mounted on said semi-trailer proximate the rear end thereof for receiving said initially amplified braking control pressure and delivering a re-amplified braking control pressure for relaying said re-amplified control pressure to the brake actuator means of said true trailer thereby minimizing the air delivery time to the brakes of said semi-trailer and said true trailer.

3. The improved braking system of claim 2, further characterized in that said booster assembly includes first and second auxiliary fluid pressure reservoirs, said first fluid pressure reservoir being directly connected to said first quick-acting relay valve and mounted on the rear end of said tractor proximate to said first relay valve and said second fluid pressure reservoir being directly connected to said second quick-acting relay valve and mounted on the rear end of said semi-trailer proximate to said second relay valve.

4. In a tractor/semi-trailer combination including a tractor having a front, a rear and tractor brakes and a semi-trailer having a front, a rear and semi-trailer brakes, an improved braking system for reducing the fluid pressure delivery time to the brakes of the semi-trailer to eliminate "jackknifing" due to trailer overrun, said braking system comprising:

a pair of tractor brake actuators;

a quick release valve coupling said pair of tractor brake actuators;

a pair of semi-trailer brake actuators;

an emergency relay valve mounted proximate the rear of said semi-trailer for operating said semi-trailer brake actuators, said emergency relay valve having an output coupled to said pair of semi-trailer brake actuators, an emergency line input, a closely coupled auxiliary supply of fluid pressure coupled to a supply input, and a service line control input;

manually-operated control valve means having a foot pedal mounted in said tractor and a control valve output for outputting a control pressure signal for controlling the application of fluid pressure to said pair of tractor brake actuators;

a reservoir mounted on said tractor for storing a supply of fluid pressure, said reservoir including a line for supplying fluid pressure to said manually-operated control valve means and an emergency line output;

a tractor protection valve mounted proximate the rear of said tractor and having a service line input coupled to the control valve output of said manually-operated control valve means, an emergency line input coupled to the emergency line output of said reservoir, a service line output and an emergency line output; and an auxiliary booster valve assembly mounted proximate the front end of said semi-trailer and including a quick-acting amplifying relay valve and a closely coupled second auxiliary fluid pressure reservoir mounted proximate said quick-acting amplifying relay valve, said second auxiliary reservoir having an input coupled to the emergency line output of said tractor protection valve and a supply output, said amplifying relay valve including a service line input coupled to the service line output of said tractor protection valve, a supply input directly coupled to the supply output of said second auxiliary reservoir and a control output coupled to the service line control input of said emergency relay valve, said quick-acting amplifying relay valve further including volumetric displacement means responsive to the fluid pressure received at said service line input for rapidly relaying a corresponding fluid pressure to the service line control input of said emergency relay valve to minimize the time lag between the operation of the tractor brakes and the application of the semi-trailer brakes to eliminate "jackknifing".

5. In a braking system for tractor-trailer combinations including a tractor having tractor brakes, a rear end and a front end and a trailer means having trailer brakes, a rear end and a front end, the front end of said trailer means being adapted to be operably coupled to the rear end of said tractor, said combination having a manually-operable means disposed in said tractor for generating a braking control pressure, an air delivery system extending substantially the length of said tractor/trailer combination starting at the rear of said tractor adjacent said manually-operable means and extending toward the rear of said trailer means, means responsive to said braking control pressure for actuating said tractor brakes, means mounted proximate the rear of said trailer means and responsive to said braking control pressure for actuating said trailer brakes, the improvement comprising a booster assembly for reducing the air delivery time to said trailer brakes comprising:

a quick-acting relay valve having a fluid pressure supply input, a valve control input, and an amplifying signal output, said quick-acting relay valve being responsive to the receipt of said braking control pressure at said valve control input for rapidly amplifying said control pressure on at least a one-to-one ratio with the control pressure applied to the tractor brake actuator means and rapidly relaying the amplified control pressure from said amplifying signal output to said trailer brake actuator means; and means for mounting said quick-acting relay valve proximate the start of said air delivery system to enable said quick-acting relay valve to even more quickly receive and amplify said braking control pressure from said manually-operable means for even more rapidly relaying said amplified control pressure to said trailer brake actuator means;

said trailer means including a semi-trailer and a true trailer, said semi-trailer having semi-trailer brakes, a front end adapted to be operably coupled to the rear end of said tractor and a rear end and said true trailer having true trailer brakes, a front end adapted to be operably coupled to the rear end of said semi-trailer and a rear end, said quick-acting relay valve being mounted on said semi-trailer proximate the front end thereof and said booster assembly further including a second quick-acting relay valve being mounted on said true trailer proximate the front end thereof for further reducing the air delivery time to the brakes of said semi-trailer and said true trailer.

6. The improved braking system of claim 5 further characterized in that said booster assembly still further includes a first and second auxiliary fluid pressure reservoir, said first fluid pressure reservoir being directly connected to said first quick-acting relay valve and being mounted immediately proximate thereto, and said second fluid pressure reservoir being directly connected to said second quick-acting relay valve and being mounted immediately proximate thereto.

* * * * *